March 28, 1939. W. J. NEEDELS 2,152,492
INCUBATOR
Filed Aug. 20, 1936 3 Sheets-Sheet 1

INVENTOR.
William J. Needels
BY Murray and Zugelter
ATTORNEYS

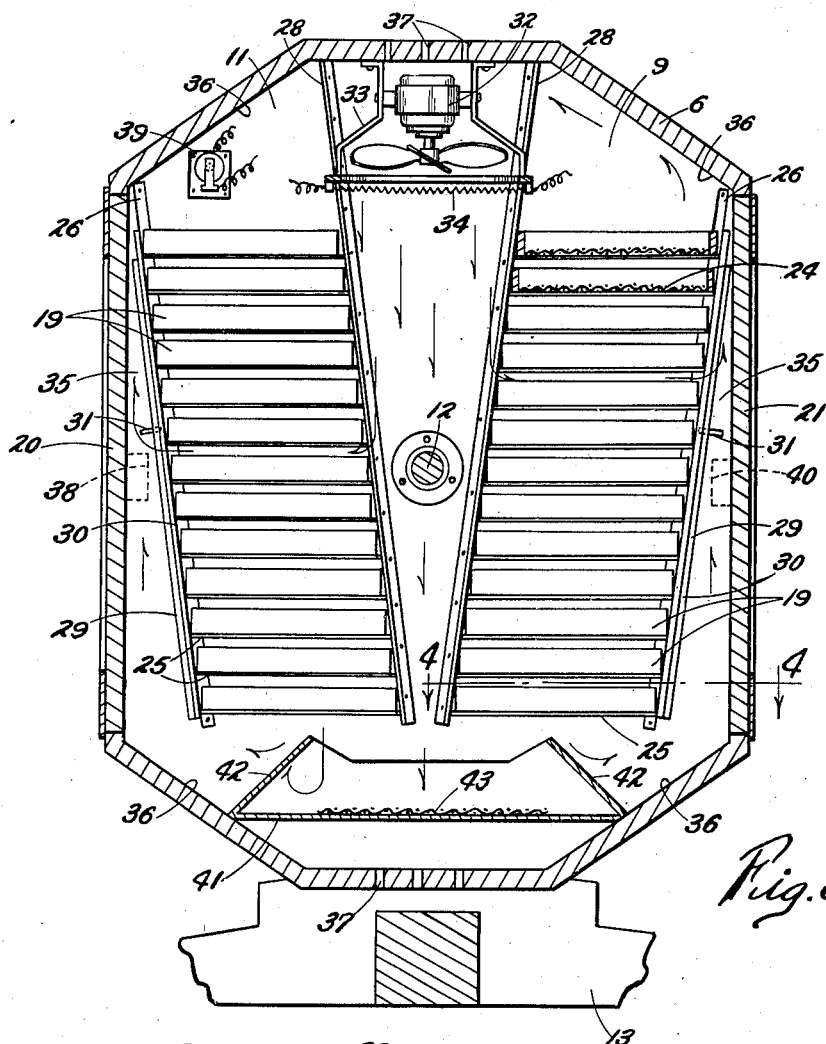
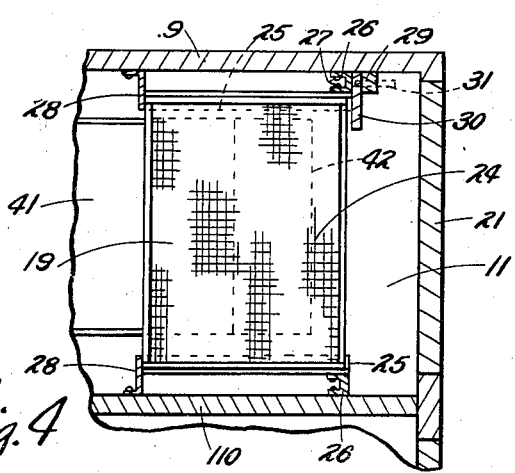

March 28, 1939. W. J. NEEDELS 2,152,492
INCUBATOR
Filed Aug. 20, 1936   3 Sheets-Sheet 3
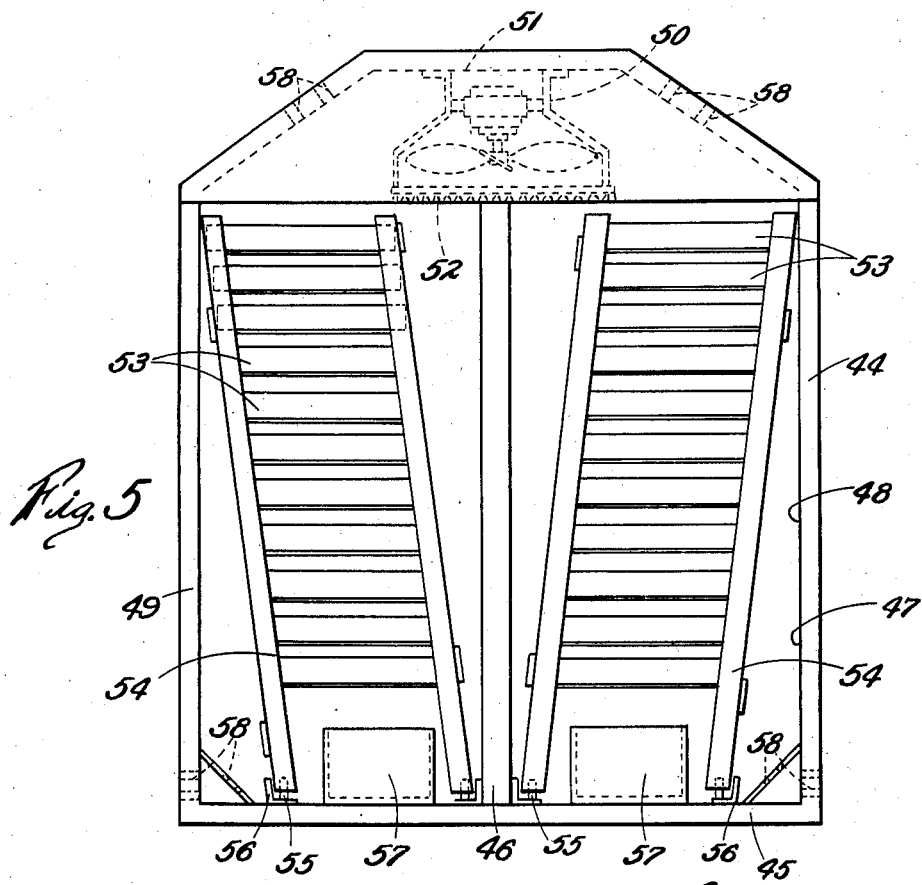
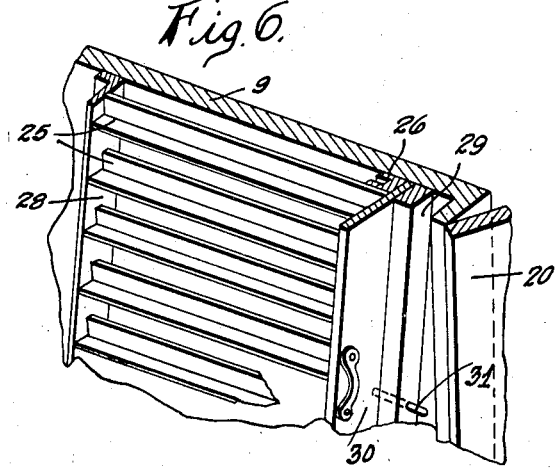
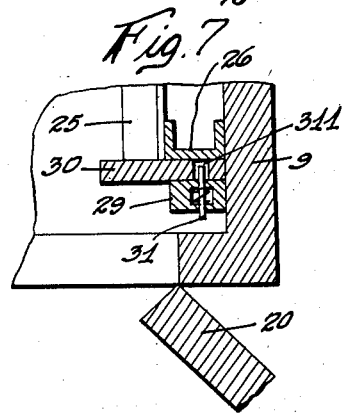
INVENTOR.
William J. Needels
BY
ATTORNEYS.

Patented Mar. 28, 1939

2,152,492

UNITED STATES PATENT OFFICE 2,152,492

INCUBATOR

William J. Needels, Cincinnati, Ohio

Application August 20, 1936, Serial No. 97,028

3 Claims. (Cl. 119—37)

The present invention relates to apparatus for the incubation of eggs and particularly to the type of incubator which employs a forced draft of heated air for maintaining the eggs at the proper temperature.

At the present time, the greatest problem encountered in the use of this type of incubator is the occurrence of cold spots in locations which do not receive the proper amount of draft. I have effectively eliminated this problem by a novel egg tray arrangement located within the incubator and it is therefore an object of this invention to provide a means whereby a forced draft of heated air is distributed equally to a plurality of egg containing trays positioned within an incubating compartment.

Another object of the invention is to provide a means whereby a plurality of egg trays may be disposed in an incubator cabinet in a compact and highly efficient manner.

Another object of the invention is to provide a tray support arrangement for an incubator to permit the insertion of similarly proportioned egg trays therein, thus facilitating the handling and positioning of said trays.

A further object of the invention is to provide for the incubation of a large quantity of eggs on a commercial scale which is carried out in relatively small compartments comprising the incubator unit.

Other objects will be apparent from the following specification and accompanying drawings, in which:

Fig. 3 is an enlarged cross sectional view taken on line 3—3 of Fig. 2.

Fig. 4 is a cross sectional view taken on line 4—4 of Fig. 3.

Fig. 5 is a front elevational view of my hatcher unit, the doors thereof being removed to disclose the interior egg tray and fan arrangement.

Fig. 6 is a fragmental perspective view showing in detail one side of my tray supporting structure and the means for precluding horizontal movement of trays positioned thereon.

Fig. 7 is a horizontal cross-sectional view taken through the spring finger member of the tray fastening means shown in Fig. 6.

The preferred embodiment of my invention to be hereinafter described relates to the stage method of incubation. The accompanying drawings set forth apparatus employed for the first stage of incubation which may, with slight modifications, be used for the last stage or hatching operation.

Figure 1:
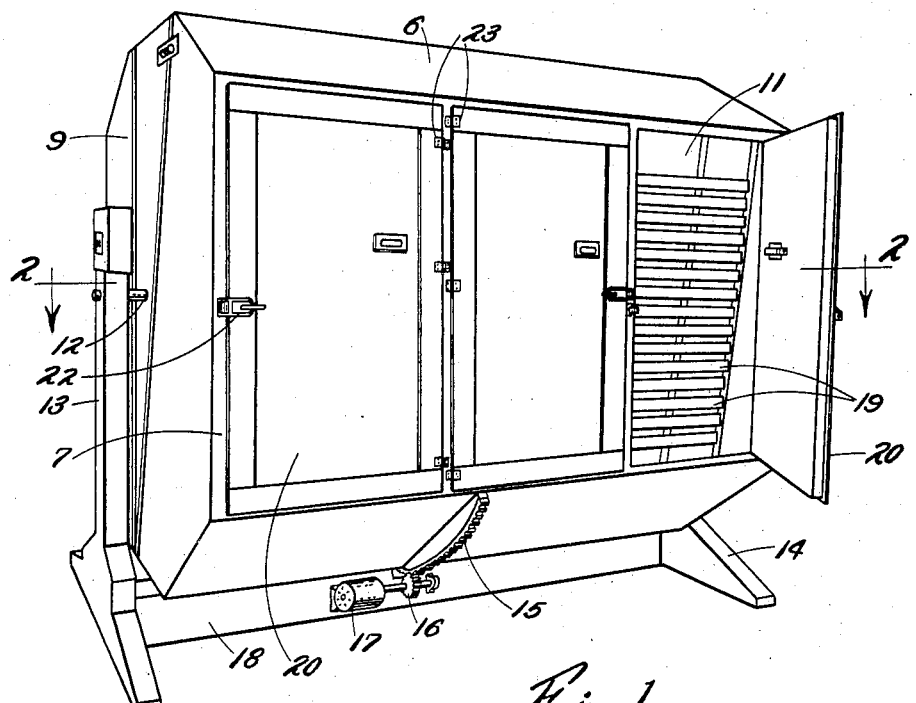
Fig. 1 is a perspective view of my incubator unit.
Figure 2:
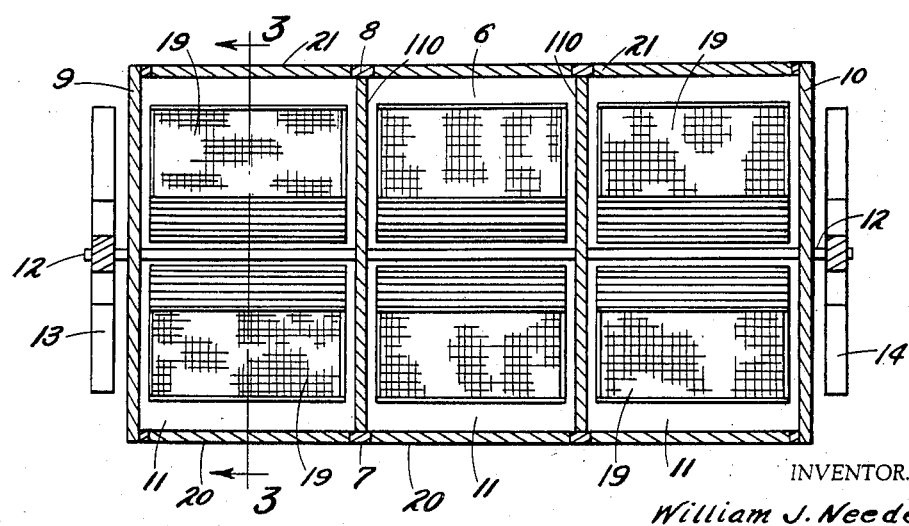
Fig. 2 is a cross sectional view taken on line 2—2 of Fig. 1, details thereof not shown for clarity.

My incubator unit comprises an octagonally shaped insulated cabinet 6, the vertical and parallel sides being elongated to form the front and rear side walls 7 and 8 thereof. The cabinet is also provided with vertical end walls 9 and 10, and is divided into three separate and identical compartments 11 by vertical partitions 110, in each of which independent incubation is carried out. The cabinet 6 is pivotally suspended upon a centrally disposed shaft or axis 12 which extends through the length of the cabinet and has its bearings in the supporting standards 13 and 14. A gear segment 15 (Fig. 1) is positioned transversely of and beneath the cabinet center and serves to produce a rocking or oscillating movement of the cabinet by meshing with a pinion 16 which is driven from a suitable reversible motor 17 secured to a longitudinal standard connecting member 18.

Each of the compartments 11 has two tiers of egg trays 19, said trays being disposed one above the other and being removable from their respective compartments by means of front and rear doors 20 and 21 respectively. The doors are provided with suitable latch members 22 and hinges 23.

Referring now to Fig. 3, it will be noted that each tier of egg trays 19 is inclined from the vertical and diverges outwardly from the common, lower adjacent portion. The trays are suitably provided with wire mesh bottoms 24 to allow partial air circulation through them. Horizontal guide members or tracks 25 support the trays along opposite ends thereof and hold the trays in spaced relationship from the inside vertical walls of the compartment by means of U-shaped channel members 26 which fasten the guides to the walls by bolts 27 (Fig. 4). A rearward stop member for the trays takes the form of an elongated angle bar 28 which is fastened to the side walls of the compartment and extends into the path of the trays supported in the guides 25 (Figs. 4, 6 and 7). To prevent the trays from horizontal movement when the cabinet is oscillated, I provide any suitable means such as an elongated block member 29 which is fastened to one vertical side wall of the compartment and spaced from the U-shaped member 26 to form a groove therebetween. Into this groove I fit a bar 30 Figs. 4, 6 and 7) which extends into the path of the trays and which is removably fastened therein by a finger member 31 which is positioned in the block and spring urged into a hole 311 in the bar.

To provide for the forced draft circulation of warm air a fan 32 is fastened centrally of the top of the compartment by means of a support structure 33. An electric heating coil 34 is positioned on the structure and in the path of the forced air as it leaves the fan blades. The fan is disposed opposite the apex of the divergent tray arrangement so that the forced draft of air heated by the coil 34 will travel downwardly toward the apex and impinge upon the innermost edges of the individual egg trays. This results in the deflection of the air outwardly and horizontally across the egg trays as indicated by the arrows. The air after leaving the trays travels upwardly through the passageways 35 to be again circulated by the fan. The octagonal shape of the cabinet provides additional deflector surfaces 36 to control the path of the circulation. Suitable ports 37 are bored in the top and bottom of the compartment to allow the necessary entrance of pure air and the emission of foul air. The compartment is also provided with a conventional hydrometer 38, thermostat 39 and thermometer 40.

The humidifier for the compartment comprises a water pan 41 positioned on the bottom of the compartment which has raised inclined sides 42 to preclude the spilling of water contained therein when the cabinet is oscillated. The bottom of the pan has fastened thereto a square of absorbent material 43 which, when the cabinet is tilted from one position to the other, is saturated with the water to humidify the air. By increasing the number of oscillations of the cabinet, the humidity of the air in the compartments is raised. It is to be noted that forced air from the fan finds its way directly to the water pan, the sides 42 acting to baffle the air and retain it for some time in contact with the water.

It is contemplated that the above described fan and tray arrangement can be used, with slight modification, in the last stages of incubation, namely, the hatching operation. Referring to Fig. 5, the cabinet 44 is constructed similar to the incubator cabinet 6 except that the former cabinet is stationary and rests upon a base 45. A narrow central post 46 extends vertically of the opening 47 to form door frames 48 and 49. A fan 50 is positioned centrally of the cabinet top 51 and has a heating element 52 located subjacent the blades thereof. The groups of egg trays 53 are slidably held in frames 54 which are provided with wheels 55, guided in tracks 56 so that the entire frame holding a group of egg trays may be slid from the cabinet as a unit. It will be seen that the frames are inclined from the vertical and diverge outwardly from their lower adjacent edges. The cabinet is also provided with suitable air humidifier pans 57, ventilation ports 58 for the emission of foul air and the admission of fresh air and it also contains the usual thermostat, hygrometer and thermometer appliances (not shown).

What is claimed is:

1. In a device of the character described the combination of a closed cabinet having a top, a bottom, and vertical side walls, an inclined tier of spaced egg trays positioned adjacent each of two opposing side walls of the cabinet and comprising a plurality of divergently arranged tray supports mounted in the cabinet, similarly proportioned trays slidably held on the supports, the inward edge of each tray projecting beyond the tray next above it, and a fan secured to the cabinet centrally above the inner top edges of the trays and adapted to direct air to said tray edges whereby to deflect said air laterally across the contents of the trays.

2. In a device of the character described the combination of a closed cabinet having a top, a bottom and vertical side walls, a fan positioned centrally of the top of the cabinet to direct a current of air downwardly therefrom, and an inclined tier of spaced egg trays positioned adjacent each of two opposing side walls of the cabinet and comprising a plurality of divergently arranged tray supports mounted in the cabinet, and similarly proportioned trays, slidably held upon the supports, the inward edge of each tray projecting beyond the tray next above it whereby a portion of said current of air impinges upon each tray edge, said edges acting to deflect the air laterally across the contents of the trays.

3. In a device of the character described the combination of a closed cabinet having horizontal top and bottom walls and vertical side walls, a fan positioned centrally of the cabinet adjacent a horizontal wall and adapted to create a current of vertically moving air therefrom, and an inclined tier of spaced egg trays positioned adjacent each of two opposing side walls of the cabinet and comprising a plurality of divergently arranged tray supports mounted in the cabinet, and similarly proportioned trays slidably held upon the supports, the inward edge of each tray projecting beyond the edge of the tray next adjacent and nearest the fan, whereby said tray edge deflects said vertically moving air laterally across the contents of the tray.

WILLIAM J. NEEDELS.